US011182407B1

(12) United States Patent
Yarlagadda

(10) Patent No.: US 11,182,407 B1
(45) Date of Patent: Nov. 23, 2021

(54) METADATA ACCESS FOR DISTRIBUTED DATA LAKE USERS

(71) Applicant: Bank of America Corporation, Charlotte, NC (US)

(72) Inventor: Sitaram C. Yarlagadda, Belmont, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/910,169

(22) Filed: Jun. 24, 2020

(51) Int. Cl.
*G06F 16/00* (2019.01)
*G06F 16/28* (2019.01)
*G06F 16/25* (2019.01)
*G06F 21/62* (2013.01)
*G06F 16/182* (2019.01)
*G06F 16/2457* (2019.01)

(52) U.S. Cl.
CPC .......... *G06F 16/283* (2019.01); *G06F 16/184* (2019.01); *G06F 16/24573* (2019.01); *G06F 16/254* (2019.01); *G06F 21/6218* (2013.01)

(58) Field of Classification Search
CPC ...... G06F 16/214; G06F 16/288; G06F 16/25; G06F 16/28
See application file for complete search history.

(56) References Cited

U.S. PATENT DOCUMENTS

| 8,738,569 | B1* | 5/2014 | Choi | G06F 16/214 |
| | | | | 707/619 |
| 2006/0041524 | A1* | 2/2006 | Li | H04N 21/235 |
| 2015/0178342 | A1* | 6/2015 | Seering | G06F 16/254 |
| | | | | 707/754 |
| 2018/0373781 | A1* | 12/2018 | Palrecha | G06N 3/0427 |
| 2020/0137069 | A1 | 4/2020 | Gerweck | |
| 2020/0142895 | A1 | 5/2020 | Gerweck et al. | |
| 2020/0145216 | A1 | 5/2020 | Clark et al. | |
| 2020/0145217 | A1 | 5/2020 | Clark et al. | |
| 2020/0151326 | A1 | 5/2020 | Patrich et al. | |

(Continued)

OTHER PUBLICATIONS

Yonghong et al., "A Metadata Generation Method for Massive Data in Distributed Databases", IEEE, 2010, pp. 1-4 (Year: 2010).*
Quix et al. ("GEEMS: A Generic and Extensible Metadata Management System for Data Lakes", Proceedings of the Caise'16 Forum at the 28th International Conference on Advanced Information Systems Engineering, published at http://ceur-ws.org, pp. 129-136, 2016) (Year: 2016).*

(Continued)

*Primary Examiner* — Cheryl Lewis
(74) *Attorney, Agent, or Firm* — Banner & Witcoff, Ltd.; Michael A. Springs

(57) ABSTRACT

Aspects of the disclosure relate to providing metadata access to distributed data lake users. In some embodiments, a computing platform may load metadata from an external metadata database into a staging database. Then, the computing platform may transform the metadata in the staging database and move the transformed metadata to a master database. The master database may comprise information indicating a relationship between the transformed metadata and one or more distributed data lakes. The computing platform may receive a request to access one or more metadata items. Then, the computing platform may authorize a distributed computing cluster user to access at least one metadata item based on the information. Based on the authorization, the computing platform may provide, to the distributed computing cluster user, access to the at least one metadata item of the one or more metadata items.

20 Claims, 8 Drawing Sheets

(56) References Cited

U.S. PATENT DOCUMENTS

| | | | |
|---|---|---|---|
| 2020/0151577 A1 | 5/2020 | Ogawa et al. |
| 2020/0153825 A1 | 5/2020 | Clark et al. |
| 2020/0153855 A1 | 5/2020 | Kirti et al. |
| 2020/0160948 A1 | 5/2020 | Hansen et al. |
| 2020/0160949 A1 | 5/2020 | Hansen et al. |
| 2020/0160955 A1 | 5/2020 | Hansen et al. |
| 2020/0162426 A1 | 5/2020 | Clark et al. |
| 2020/0162427 A1 | 5/2020 | Clark et al. |
| 2020/0162428 A1 | 5/2020 | Clark et al. |
| 2020/0167362 A1 | 5/2020 | Punuru et al. |
| 2020/0167485 A1 | 5/2020 | Gupta et al. |
| 2020/0169470 A1 | 5/2020 | Parandehgheibi et al. |
| 2020/0171384 A1 | 6/2020 | Goslin et al. |
| 2020/0174844 A1 | 6/2020 | Bergsma et al. |
| 2020/0174987 A1 | 6/2020 | McCreight et al. |
| 2020/0175402 A1 | 6/2020 | Cameron et al. |
| 2020/0177552 A1 | 6/2020 | Morris et al. |
| 2020/0184355 A1 | 6/2020 | Mehta et al. |
| 2020/0192703 A1 | 6/2020 | Kambatla |
| 2020/0192865 A1 | 6/2020 | Eads et al. |

OTHER PUBLICATIONS

Matillion, "Essential Guide to Data Lakes", Designing Data Lakes to Optimize Analytics, pp. 1-37, p. matillion.com (Year: 2019).*

Nogueira et al., "Modeling Data Lake Metadata with a Data Vault", ACM, pp. 1-9, 2018. (Year: 2018).*

De Giusti et al., Extract, Transform and Load Architecture for Metadata Collection, https://www.aacademica.org/marisa.de.giusti/24, pp. 1-5, 2011. (Year: 2011).*

Farrugia et al., "Towards Social Network Analytics for Understanding and Managing Enterprise Data Lakes", IEEE/ACM, pp. 1213-1220. (Year: 2016).*

Databricks, "Data Warehouses Meet Data Lakes", https://databricks.com, p. 1-1 (Year: 2021).*

Yellowbrick, "Unlocking the Value of Data Lakes with Hybrid Cloud Analytics", Featured Whitepaper, pp. 1-2, 2021, Yellowbrick Data.pdf (Year: 2021).*

Nargesian et al., "Data Lake Management: Challenges and Opportunities", Proceedings of the VLDB Endowment, vol. 12, No. 12, pp. 1986-1989, 2019. (Year: 2019).*

* cited by examiner

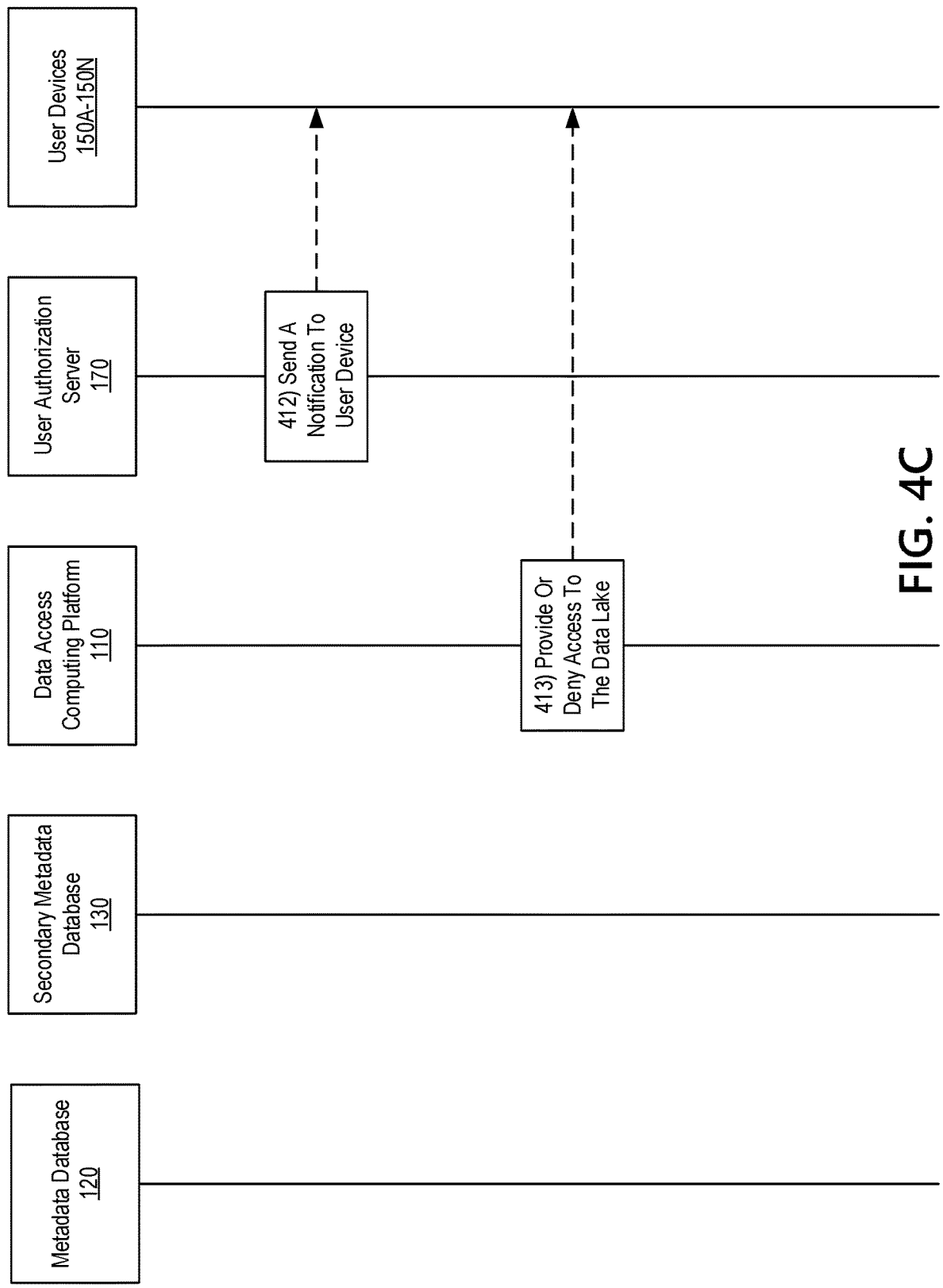

METADATA ACCESS FOR DISTRIBUTED DATA LAKE USERS

BACKGROUND

Aspects of the disclosure relate to providing metadata access to distributed data lake users and preventing unauthorized access to metadata resources. In particular, one or more aspects of the disclosure relate to sourcing data from a metadata database, storing metadata in a database, and providing access to the metadata database to distributed data lake users.

Database management is among the most important concerns of any enterprise organization. In order to accommodate the massive amounts of data maintained by an enterprise organization, large-scale data warehouses are commonly used to store the data and accommodate data-related inquiries from different data processing applications. Various frameworks are available for managing such data warehouses. For example, Apache Hadoop is an open-source software package that provides a software framework for distributed storage and processing of big data using various programming modules.

Apache Hive is an open-source data warehouse system that is built on top of Hadoop and provides interfaces and methods for querying and analyzing data files stored in Hadoop. In addition, Hive stores metadata associated with Hive tables (e.g., schemas and locations) and partitions in an external relational database (e.g., metastore). Hive metadata plays a vital role in the maintenance and day-to-day technical operations of data lake users. Ensuring that metadata is easily accessible to appropriate users without disturbing the main functions of metadata may be important for data lake users to perform regular operational and control procedures. In many instances, however, it may be difficult for distributed data lake users to access the Hive metadata.

SUMMARY

Aspects of the disclosure provide effective, efficient, scalable, and convenient technical solutions that address and overcome the technical problems associated with providing metadata access to distributed user devices by sourcing metadata from a secondary metadata database to a different database and providing metadata access to distributed data lakes users.

In accordance with one or more embodiments, a computing platform having at least one processor, a communication interface, and memory may load metadata from an external metadata database into a staging database. Subsequently, the computing platform may transform the metadata in the staging database. Transforming the metadata in the staging database may comprise decoupling one or more data models in the metadata, resulting in one or more decoupled data models, and denormalizing the one or more decoupled data models, resulting in transformed metadata. Thereafter, the computing platform may move the transformed metadata from the staging database into a master database. The master database may comprise information indicating a relationship between the transformed metadata and one or more distributed data lakes. The computing platform may receive, via the communication interface and from at least one distributed computing cluster user device linked to at least one distributed computing cluster user, a request to access one or more metadata items. In response to receiving the request to access the one or more metadata items, the computing platform may authorize the at least one distributed computing cluster user to access at least one metadata item of the one or more metadata items based on the information indicating the relationship between the transformed metadata and the one or more distributed data lakes. Based on authorizing the at least one distributed computing cluster user to access the at least one metadata item of the one or more metadata items, the computing platform may provide, to the at least one distributed computing cluster user device linked to the at least one distributed computing cluster user, access to the at least one metadata item of the one or more metadata items.

In some embodiments, loading the metadata from the external metadata database into the staging database may comprise loading the metadata from a Hive metadata database into the staging database.

In some embodiments, loading the metadata from the external metadata database into the staging database may comprise loading the metadata from a replicated database for Hive metadata into the staging database.

In some embodiments, receiving, via the communication interface and from the at least one distributed computing cluster user device linked to the at least one distributed computing cluster user, the request to access the one or more metadata items may comprise receiving, via the communication interface and from the at least one distributed computing cluster user device linked to a Hadoop data lake user, the request to access the one or more metadata items.

In some embodiments, loading the metadata from the external metadata database into the staging database may comprise loading the metadata from the external metadata database stored on a first server into the staging database. In addition, a main database storing data associated with the metadata may be stored on a second server.

In some embodiments, loading the metadata from the external metadata database may comprise performing an extract, transform, and load (ETL) process on the metadata in the external metadata database to store the metadata in the staging database.

In some embodiments, authorizing the at least one distributed computing cluster user to access the at least one metadata item of the one or more metadata items based on the information indicating the relationship between the transformed metadata and the one or more distributed data lakes may comprise authorizing the at least one distributed computing cluster user to access the at least one metadata item of the one or more metadata items based on the information indicating the relationship between the transformed metadata and the one or more distributed data lakes and based on role-based access control.

In some embodiments, the computing platform may distribute the metadata from the master database into a plurality of individual databases based on the information indicating the relationship between the transformed metadata and the one or more distributed data lakes. In addition, at least one individual database of the plurality of individual databases may correspond to at least one data lake of the one or more distributed data lakes. The computing platform may publish the at least one individual database of the plurality of individual databases into the at least one data lake of the one or more distributed data lakes.

In some embodiments, loading the metadata from the external metadata database into the staging database may comprise loading the metadata from a MySQL database for Hive metadata into the staging database.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4C depict an illustrative event sequence for providing metadata access to distributed user devices in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

In some instances, an enterprise organization may adapt Hadoop Eco System Tools: Hive to implement data lakes for the organization. When data is stored in Hive, metadata of the stored data may be stored in a separate database (e.g., Hive Metastore). Metastore may be the central repository of Hive metadata. Metadata may play a vital role in the maintenance and day-to-day technical operations of data lakes. Unlike traditional relational database management system (RDBMS) or massively parallel processing (MPP) systems, metadata might not be stored implicitly in Hive. Rather, metadata may be stored in an external database on an external server (e.g., Postgres server, MySQL server, Oracle server, SQL server). In addition, metadata might not be accessible to anyone and may be prone to change with upgrades of Hive. Thus, users (e.g., data lake technical operations team, vendors) might not have access to Hive metadata to perform their day-to-day functions.

Some aspects of the present disclosure describe ways of connecting to a replica of a metadata database to source, process, and load the metadata into a separate database, and allow data lake users to access and consume the metadata.

Figure 1A:
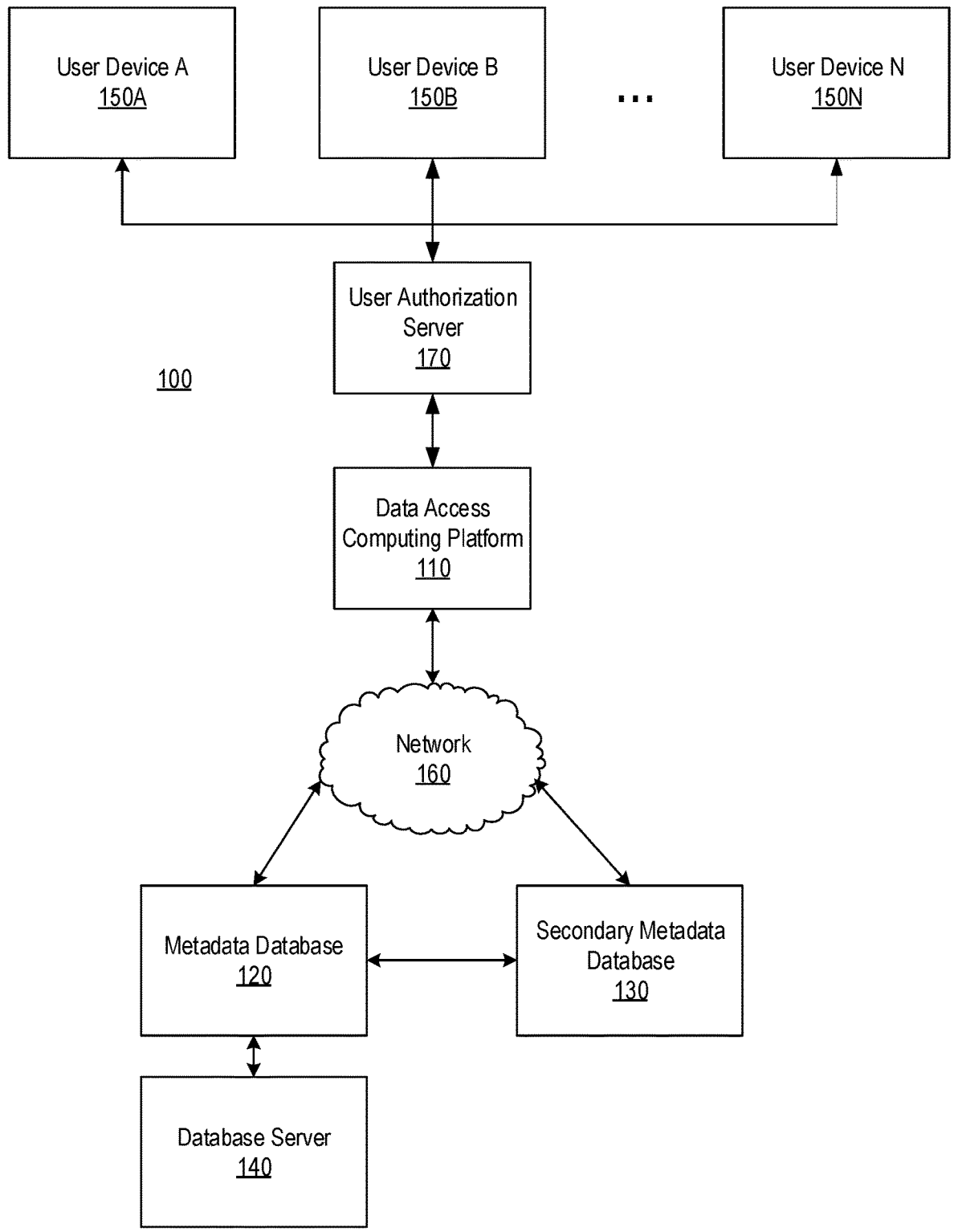
FIGS. 1A and 1B depict an illustrative computing environment for providing metadata access to distributed user devices in accordance with one or more example embodiments.
Figure 1B:
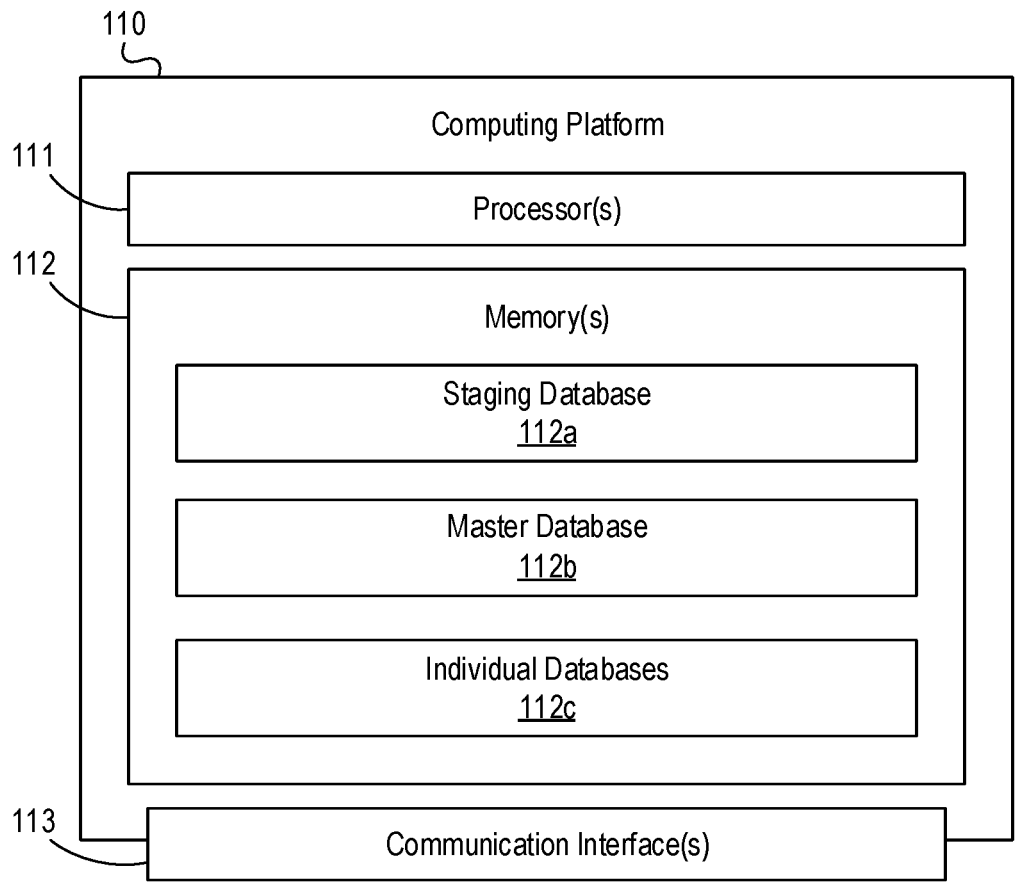

FIGS. 1A and 1B depict an illustrative computing environment for providing metadata access to distributed user devices in accordance with one or more example embodiments. Referring to FIG. 1A, computing environment 100 may include one or more computing devices, systems, and databases. For example, computing environment 100 may include a data access computing platform 110, a metadata database 120, a secondary metadata database 130, a database server 140, user devices 150A-150N, and a user authorization server 170.

As illustrated in greater detail below, data access computing platform 110 may include one or more computing devices configured to perform one or more of the functions described herein. For example, data access computing platform 110 may include one or more computing devices and/or other computer components (e.g., processors, memories, communication interfaces). In addition, and as illustrated in greater detail below, data access computing platform 110 may be configured to receive information from, send information to, and/or otherwise exchange information with one or more local or remote devices. In some examples, data access computing platform 110 may include or integrate into a controlled Hive database server. The functions of the Sentry controller Hive database server will be illustrated in greater detail below.

Metadata database 120 may include one or more databases that store metadata and/or function as a metadata repository. Metadata database 120 may be connected to database server 140 and secondary metadata database 130 via a network such as network 160. Metadata may include information about the structures that contain actual data. For example, metadata database 120 may be a Hive metastore that stores metadata about objects created in Hive. The metadata may include names of databases with permissions, names of tables and views, names of tables and view columns with data types, partitions and conditions, names of indexes and referential integrity keys, locations of data stored on a distribution file system (e.g., Hadoop Distributed File System (HDFS)), and other relevant metadata. Users may access metadata database 120 based on a service application programming interface (API) associated with metadata database 120. For example, users may use open database connectivity (ODBC) or Java database connectivity (JDBC) connections to access metadata database 120 (e.g., Hive Metastore). The metadata database service may be stateless, which may allow processing more than one instance of the service. However, metadata database 120 might not provide open connectivity to end users due to the impact on actual product performance. Therefore, sourcing metadata from metadata database 120 based on batch processing, and processing the sourced data may be useful for end users to access and use the metadata.

Secondary metadata database 130 may include one or more databases that store metadata. Similar to metadata database 120, secondary metadata database 130 may store information about the structures that contain actual data. Secondary metadata database 130 may be a replicated database of metadata database 120 for disaster recovery purposes or off-premise processing purposes. For example, secondary metadata database 130 may replicate Hive metadata from metadata database 120. If, for instance, the Hive metastore is stored in MySQL format, the Hive metastore may have built-in replication functionality, which uses remote mirroring to replicate Hive metadata.

Database server 140 may include one or more computing devices and/or other computer components (e.g., processors, memories, communication interfaces). In addition, database server 140 may be configured to receive information from, send information to, and/or otherwise exchange information with one or more devices and/or databases. Database server 140 may be configured to store tables and other types of data in a database, and manage and query structured data stored in the tables. In some embodiments, database server 140 may be a Hive database server, which may be configured to store a namespace or a collection of tables in one or more databases.

User devices 150A-150N may include one or more computing devices and/or other computer components (e.g., processors, memories, communication interfaces). For example, one or more user devices 150A-150N may be a mobile computing device (e.g., smartphone, tablet, smart watch, laptop computer, or the like) or desktop computing device (e.g., desktop computer, terminal, or the like). In addition, one or more user devices 150A-150N may be linked to and/or used by one or more users (who may, e.g., be a technical team member of an application or a device that intends to use or access the metadata stored in metadata database 120 or secondary metadata database 130). One or more user devices 150A-150N may be capable of receiving a user interface, receiving or sending input via the user interface, and communicating the received input to one or more other computing devices. One or more user devices 150A-150N may use the user interface to communicate with user authorization server 170 and/or data access computing platform 110 via a network such as network 160.

User authorization server 170 may include one or more computing devices and/or other computer components (e.g., processors, memories, communication interfaces). User authorization server 170 may apply access policies to authenticate the credentials (e.g., account names and passwords) of the users. User authorization server 170 may also authorize user devices based on determining whether a privilege may be granted to a particular user, which keeps information (e.g., metadata) from becoming known to unauthorized users. User authorization server 170 may communicate with user devices 150A-150N and data access computing platform 110 via a network such as network 160. In some examples, user authorization server 170 may be a separate Sentry server or integrated into data access computing platform 110 so that data access computing platform 110 performs user authorization.

As illustrated in greater detail below, some aspects of the disclosure may provide technical benefits that are not provided by conventional systems. For example, one or more aspects of the disclosure may (a) eliminate the need for a platform operations team to provide metadata information manually to data lake users; (b) provide automated metadata refresh functionality, and thereby make metadata available where actual data also resides; (c) improve technical operations and efficiency of data lakes; (d) diminish the manual intervention needed to process the metadata; (e) provide a connection to a secondary metadata database to fetch data, to enable data fetching without interrupting the distributed file system; (f) eliminate a binary access requirement with role-based access control (RBAC); (g) provide seamless integration with a Sentry system to provide an RBAC solution; (h) provide flexibility for data lake users to work on metadata using structured query language (SQL); (i) eliminate complex programming efforts to fetch metadata; and/or (j) provide other solutions to Hadoop ecosystem challenges such as known problems with small files.

Computing environment 100 also may include one or more networks, which may interconnect one or more of data access computing platform 110, metadata database 120, secondary metadata database 130, database server 140, user devices 150A-150N, and a user authorization server 170. For example, computing environment 100 may include a network 160 (which may, e.g., interconnect data access computing platform 110, metadata database 120, secondary metadata database 130, database server 140, user devices 150A-150N, and user authorization server 170, and/or one or more other systems which may be associated with an enterprise organization, such as a financial institution, with one or more other systems, public networks, sub-networks, and/or the like).

In one or more arrangements, data access computing platform 110, metadata database 120, secondary metadata database 130, database server 140, user devices 150A-150N, and user authorization server 170 may be any type of computing device capable of receiving a user interface, receiving input via the user interface, and communicating the received input to one or more other computing devices. For example, data access computing platform 110, metadata database 120, secondary metadata database 130, database server 140, user devices 150A-150N, user authorization server 170, and/or the other systems included in computing environment 100 may, in some instances, include one or more processors, memories, communication interfaces, storage devices, and/or other components. As noted above, and as illustrated in greater detail below, any and/or all of data access computing platform 110, metadata database 120, secondary metadata database 130, database server 140, user devices 150A-150N, and user authorization server 170 may, in some instances, be special-purpose computing devices configured to perform specific functions.

Referring to FIG. 1B, data access computing platform 110 may include one or more processor(s) 111, memory(s) 112, and communication interface(s) 113. A data bus may interconnect processor 111, memory 112, and communication interface 113. Communication interface(s) 113 may be a network interface configured to support communication between data access computing platform 110 and one or more networks (e.g., network 160 or the like). Memory 112 may include one or more program modules having instructions that when executed by processor 111 cause data access computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of data access on computing platform 110 and/or by different computing devices that may form and/or otherwise make up data access computing platform 110. For example, memory 112 may have, store, and/or include a staging database 112a, a master database 112b, and one or more individual databases 112c. In some embodiments, the information stored in memory 112 may be stored in a single database, or separated into different logical, virtual, or physical databases, depending on system design.

One or more processor(s) 111 and/or one or more program modules stored in memory 112 may store and/or otherwise have instructions that direct and/or cause data access computing platform 110 to perform an extract, transform, load (ETL) process on metadata and store the metadata in staging database 112a. Details of the ETL process will be illustrated in greater detail below. One or more processor(s) 111 and/or one or more program modules stored in memory 112 may store and/or otherwise have instructions that direct and/or cause data access computing platform 110 to transform the metadata in staging database 112a to master database 112b. One or more processor(s) 111 and/or one or more program modules stored in memory 112 may store and/or otherwise have instructions that direct and/or cause data access computing platform 110 to distribute the information stored in master database 112b into one or more individual databases 112c.

Figure 2:
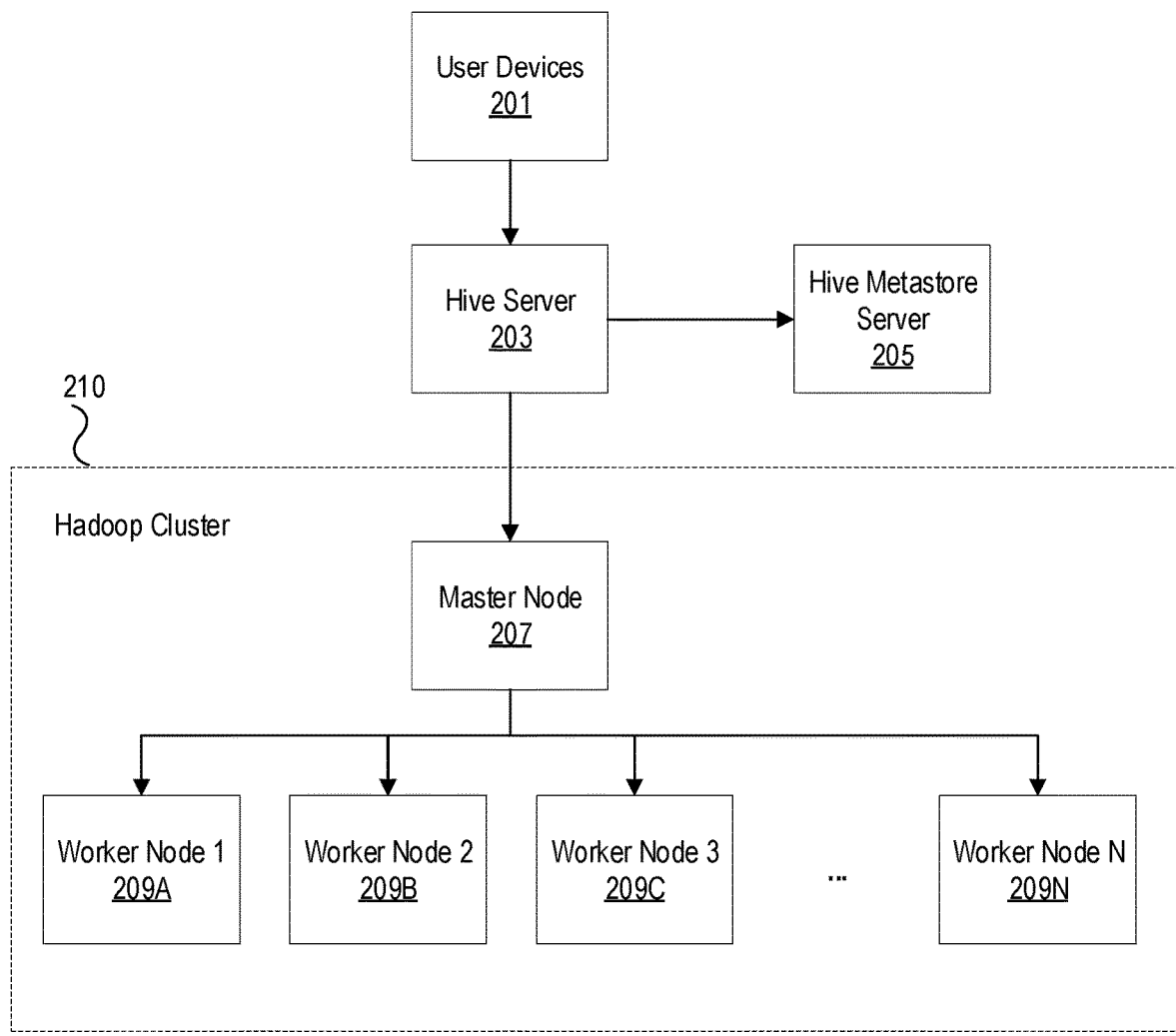
FIG. 2 depicts an illustrative computing environment of a Hive architecture in relation to Hadoop data clusters in accordance with one or more example embodiments.

FIG. 2 depicts an illustrative computing environment of a Hive architecture in relation to Hadoop data clusters in accordance with one or more example embodiments. Hadoop is an open-source software framework for data storage and large-scale processing of data on distributed clusters that are typically made up of commodity hardware. A Hadoop implementation may typically include four modules: a Hadoop distributed file system (HDFS) module, a MapReduce module, a Hadoop Common module, and a YARN module. Each of the modules may carry out particular tasks associated with big data management and analytics.

The HDFS module may allow data to be stored across a large number of distributed data storage devices. The MapReduce module may provide a programming and implementing method for processing data stored in distributed locations. The Hadoop Common module may provide tools needed for end user computer systems to read and access data stored in the Hadoop ecosystem. The YARN module may manage resources associated with various Hadoop clusters. Various other features, modules, and/or functionalities may also be part of the Hadoop framework.

Referring to FIG. 2, a Hadoop cluster 210 may include a master node 207 and one or more worker nodes 209A-209N. Master node 207 may oversee key operations associated with a Hadoop implementation. The key operations may include storing data in HDFS and running parallel computations on that data using MapReduce. Master node 207 may coordinate and manage the data storage associated with each of worker nodes 209A-209N with the HDFS. One or more worker nodes 209A-209N may store and process Hadoop data. In addition, one or more worker nodes 209A-209N may communicate with and/or report to master node 207 with regard to the health and status of the data locally stored in one or more worker nodes 209A-209N. Hadoop cluster 210 may include other types of nodes such as client nodes and data nodes.

In some embodiments, Hive server 203 and Hive metastore server 205 may be built on top of Hadoop cluster 210. Hive server 203 and Hive metastore server 205 may provide data summarization and analysis, and SQL-type queries for large data files stored in various databases and systems associated with Hadoop cluster 210. Hive server 203 may convert SQL-type queries into a set of jobs (e.g., MapReduce jobs) for execution on Hadoop cluster 210. Hive server 203 may include one or more computing devices and/or other computer components (e.g., processors, memories, communication interfaces). Hive server 203 may receive SQL-type queries from user devices 201 via the communication interfaces. Hive metastore server 205 may include one or more computing devices and/or other computer components (e.g., processors, memories, communication interfaces). Hive metastore server 205 may store metadata for each of the stored tables in a traditional RDBMS format. A backup server may regularly replicate the metadata in case of data loss.

Figure 3:
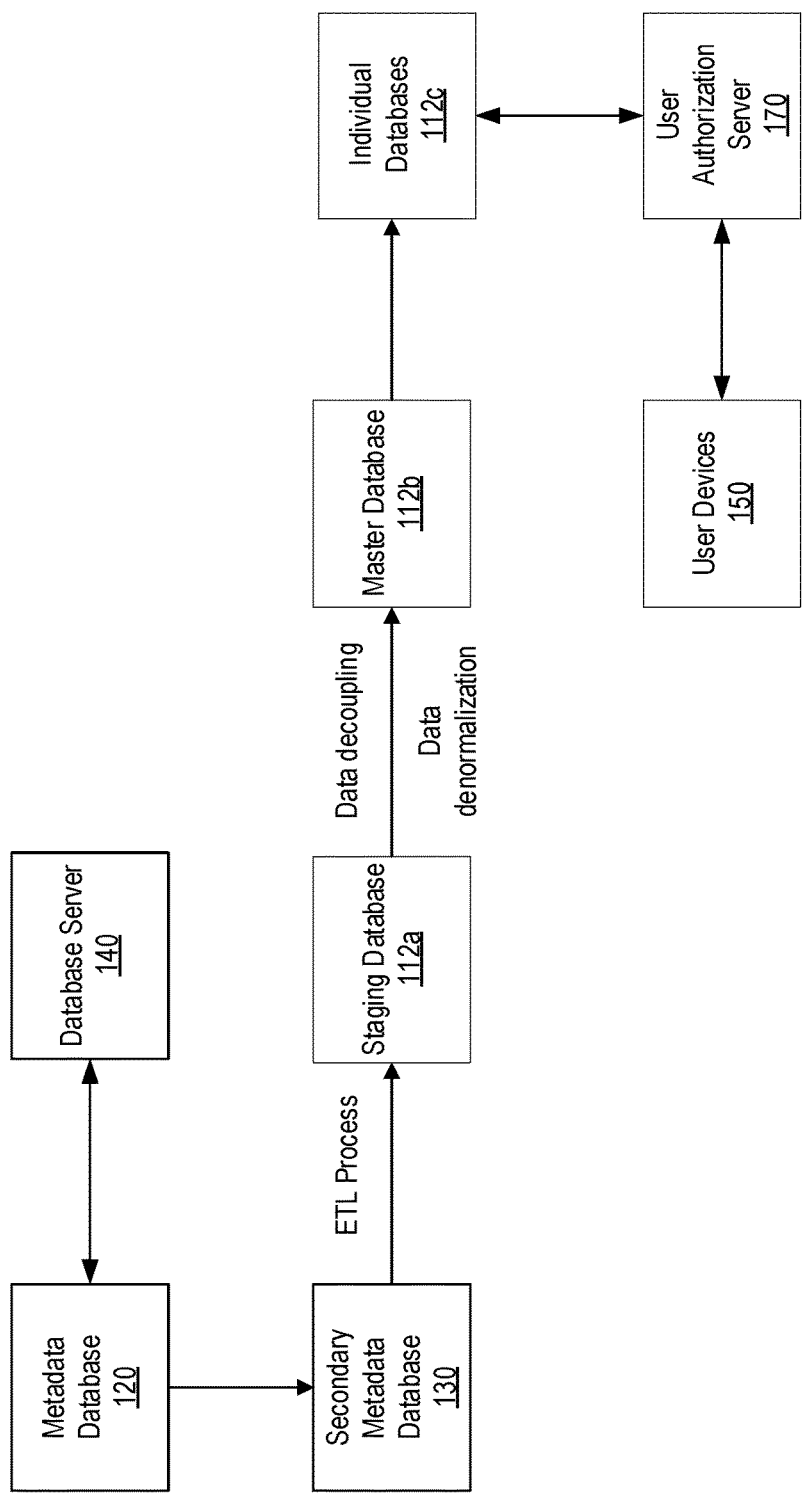
FIG. 3 depicts a set of illustrative modules of providing metadata access to distributed user devices in accordance with one or more example embodiments.

FIG. 3 depicts an example illustrating how various systems in computing environment 100 may operate to provide metadata access to distributed user devices in accordance with one or more example embodiments.

As discussed above, metadata database 120 may be a Hive metastore that stores metadata about objects and data created in Hive. Secondary metadata database 130 may be a replicated database of metadata database 120 for disaster recovery purposes or off-premise processing purposes. Database server 140 may be a Hive database server, which may be configured to store tables and other types of data in a database, and to manage and query structured data stored in the tables. In some embodiments, a replication process may be performed based on metastore event/notification and export-import functionalities associated with Hive metastore server 205. Specifically, Hive metadata and/or data stored in various HDFS locations such as Hadoop clusters may be exported to a different database (e.g., secondary metadata database 130) using an API associated with the Hive metastore server 205. In some examples, only a portion of the Hive metadata (e.g., specific tables and partitions) may be duplicated from the original Hive metastore.

In the Hadoop framework, data typically resides in HDFS, although it may reside in any Hadoop filesystem, including the local filesystem. But Hive may store the metadata in an external relational database (e.g., external MySQL database) and not in HDFS. As a result, data lake users (e.g., technical team members) might not have access to metadata directly. If any user needs to access metadata, the user might need to use standard Hive data definition language (DDL) commands such as "show create table" to fetch individual objects metadata. It often may be cumbersome and inconvenient to fetch metadata for required operations. There remains a need to have an easy way for providing appropriate users with access to metadata. In accordance with one or more aspects of the disclosure, to provide a way to access the Hive metadata, a routine may be established to fetch metadata from a secondary metadata database and then store this metadata where actual data resides for easy and effective consumption.

As discussed above, data access computing platform 110 may include memory 112, which may have, store, and/or include staging database 112a, master database 112b, and one or more individual databases 112c. Data access computing platform 110 may routinely perform an ETL process on the metadata stored in secondary metadata database 130 to fetch metadata into staging database 112a. For example, data access computing platform 110 may perform an ETL nightly build process on metadata stored in secondary metadata database 130. The metadata in secondary metadata database 130 may be loaded into staging database 112a (or refreshed in staging database 112a) regularly. In order not to disturb or interrupt the actual operations of the distributed file system (e.g., the Hadoop system), data access computing platform 110 may load metadata from secondary metadata database 130 instead of metadata database 120.

After the metadata is loaded into staging database 112a, data access computing platform 110 may transform the metadata in staging database 112a. For example, data access computing platform 110 may decouple one or more data models in the metadata using referential integrity, resulting in one or more decoupled data models. Then, data access computing platform 110 may denormalize the one or more decoupled data models, resulting in transformed metadata. The details of transforming the metadata in staging database 112a will be discussed in greater detail below. Data access computing platform 110 may then move the transformed metadata from staging database 112a into master database 112b. Master database 112b may include information indicating a relationship between the transformed metadata and one or more distributed data lakes. In some examples, the original metadata may include a relationship between a portion of the metadata and one or more distributed data lakes.

After the transformed metadata is moved to master database 112b, data access computing platform 110 may distribute the metadata from master database 112b into one or more individual databases 112c based on the information indicating the relationship between the transformed metadata and the one or more distributed data lakes. User authorization server 170 may receive a request to access the metadata from one or more user devices 150A-150N.

User authorization server 170 may authenticate the user request and provide metadata access based on the authentication results. The details of authorization and authentication will be illustrated in greater detail below. In some embodiments, user authorization server 170 may be integrated into data access computing platform 110 or a Lightweight Directory Access Protocol (LDAP) layer. The LDAP layer may be a standard application protocol associated with an enterprise organization for managing and processing distributed directory information services.

Figure 4A:
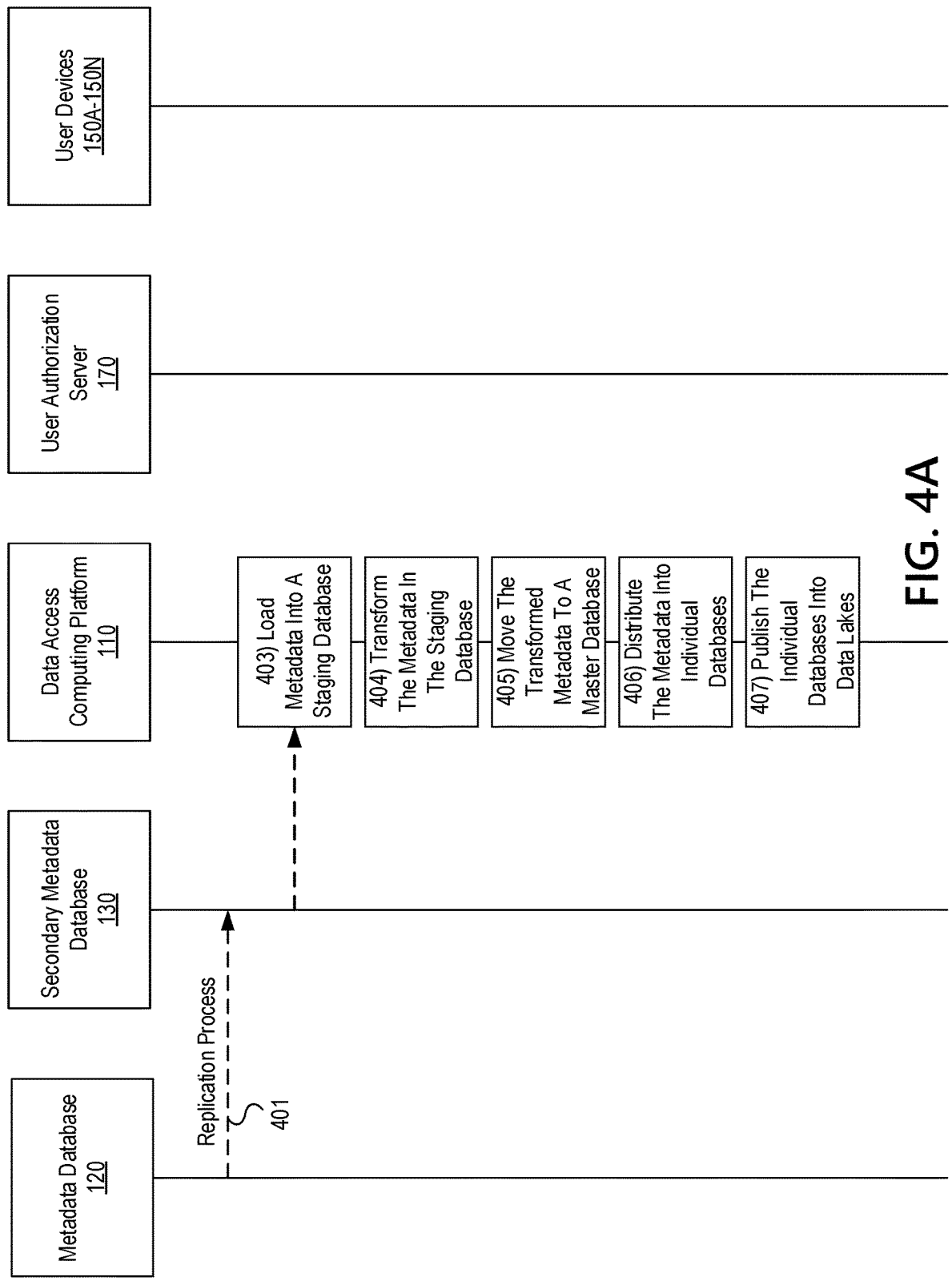
Figure 4B:
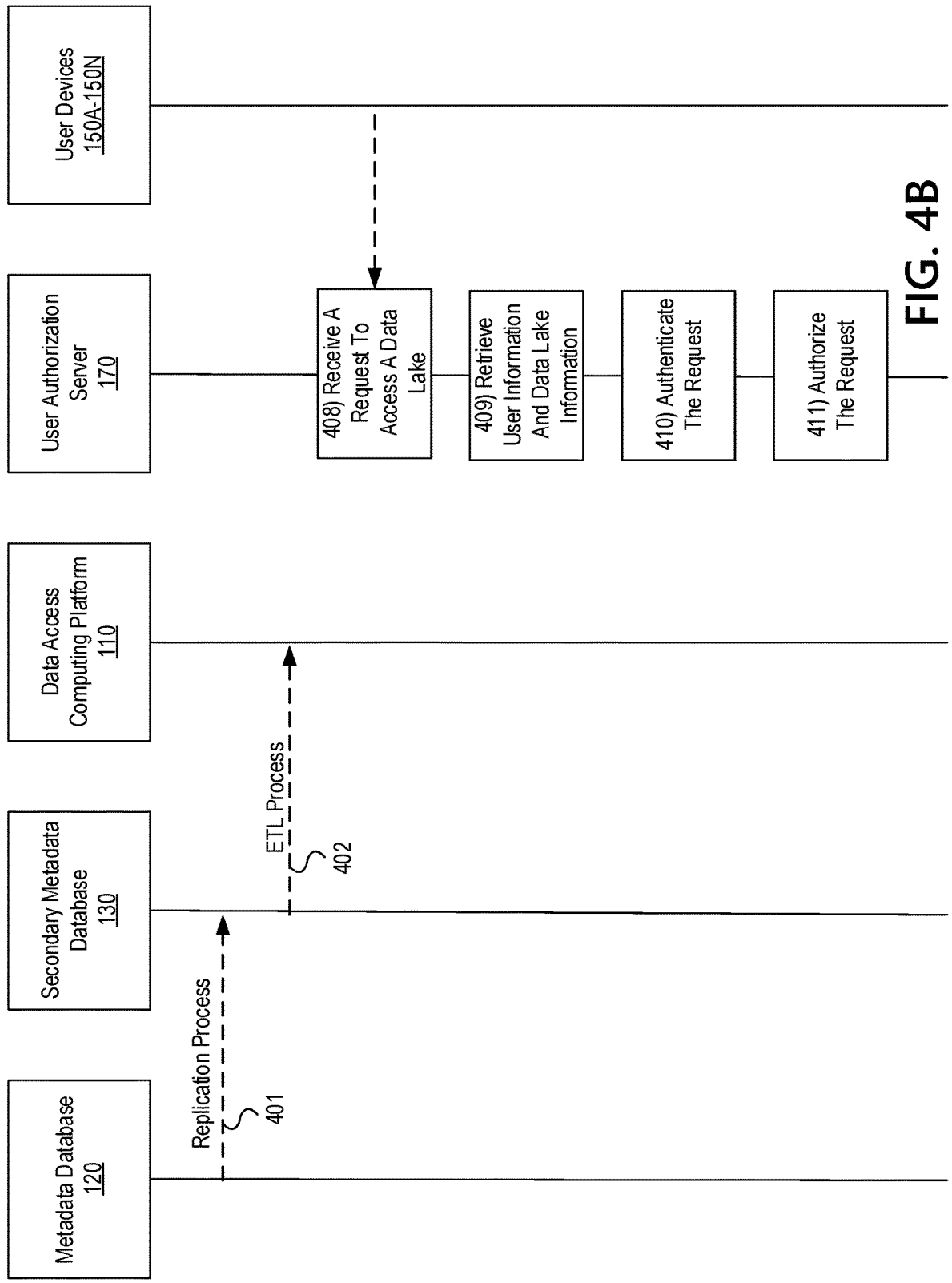

FIGS. 4A-4C depict an illustrative event sequence for providing metadata access to distributed user devices in accordance with one or more example embodiments. Referring to FIG. 4A, at step 401, a replication process may be performed. For example, at step 401, a Hive replication process may be performed as discussed above. At step 403, data access computing platform 110 may load metadata into a staging database. For example, at step 403, data access computing platform 110 may perform an ETL process on metadata and store the metadata in staging database 112a. During this process, data may be taken (extracted) from secondary metadata database (e.g., a replica Hive metastore), converted (transformed) into a format that can be analyzed, and stored (loaded) into a data warehouse (e.g., staging database 112a). The ETL process may be performed automatically or manually based on an administrator's command and/or settings. In some embodiments, data access computing platform 110 may execute the three phases (i.e., extract, transform, load) at the same time in order to save or minimize the data extraction time. For example, while the metadata is being extracted, another transformation process may be performed. At the same time, metadata already received may be processed and prepared for loading to staging database 112a. In addition, the metadata loading may begin without waiting for the previous phases to end. In some embodiments, extracting metadata or updating extracted metadata may be frequently performed on a daily, weekly, monthly basis, or based on any suitable time interval depending on a predetermined setting, the users' requests, and/or the type of the metadata.

In some embodiments, ETL systems may load data from multiple sources (e.g., databases, applications, systems). For example, data access computing platform 110 may load metadata from secondary metadata database 130 and metadata database 120 at the same time. Additionally or alternatively, data access computing platform 110 may load metadata from only secondary metadata database 130 so that regular operations of the data server (e.g., Hive) and the related distributed file system (e.g., Hadoop) might not be disturbed.

At step 404, data access computing platform 110 may transform the metadata in staging database 112a. For example, at step 404, data access computing platform 110 may transform the metadata loaded in staging database 112a to master metadata in master database 112b. Specifically, data access computing platform 110 may decouple the data models in staging database 112a using referential integrity and denormalize the decoupled data models. In some embodiments, data in Hive may be categorized into: table, partition, and bucket. Hive may organize and divide tables into partitions so that the same type or values of data may be grouped together. The tables in Hive may have partition keys to identify one or more specific partitions. Hive metadata may describe the layout (e.g., locations, columns) of the data in the table and the partitions. As a result, data access computing platform 110 may decouple the data models (e.g., tables, partitions, columns, rows) in staging database 112a. Then, data access computing platform 110 may denormalize (e.g., improve the read performance of a database) the decoupled data, which may result in denormalized tables.

At step 405, data access computing platform 110 may move the transformed metadata to a master database. For example, data access computing platform 110 may move the transformed metadata from staging database 112a to master database 112b. The transformed metadata in master database 112b may include information indicating the relationship between the transformed metadata and the one or more distributed data lakes (e.g., Hadoop data lakes). For example, the information may indicate which metadata is associated with or can be accessed by which one of the distributed data lakes. This information may be originally stored in the metadata (e.g., in a separate table in Hive metadata) in various formats to correlate the original and transformed metadata, and one or more distributed data lakes. In some embodiments, the relationship between metadata and data lakes might not be a one-to-one relationship. In some embodiments, one distributed data lake may be associated with more than one metadata item.

At step 406, data access computing platform 110 may distribute the metadata in the master database into one or more individual databases. For example, data access computing platform 110 may distribute the metadata in master database 122b into one or more individual databases 112c based on the information indicating the relationship between the transformed metadata and the one or more distributed data lakes. The metadata may be stored in an individual database where actual data (e.g., Hive tables) associated with the metadata resides. In some embodiments, at least one individual database may correspond to at least one of the distributed data lakes.

At step 407, data access computing platform 110 may publish the individual databases into data lakes based on the relationship between the individual databases and the data lakes. For example, data access computing platform 110 may publish one or more individual databases 112c into one or more distributed data lakes (e.g., Hadoop distributed data lakes) so that it may be convenient and feasible for various user devices to access the data lakes.

Referring to FIG. 4B, at step 401, a replication process may be performed. For example, at step 401, a Hive replication process may be performed as discussed above. At step 402, data access computing platform 110 may perform an ETL process on the metadata in a secondary metadata database, as discussed above. At step 408, user authorization server 170 (or data access computing platform 110) may receive a request to access a data lake or one or more metadata items from a user device. For example, user authorization server 170 may receive a request (e.g., a SQL query) to access a data lake from user devices 150A-150N. The request may include user information (e.g., a user profile), user device information device, and/or information of the requested data lake. For example, the request may indicate which group of an enterprise the user belongs to and/or user profile information of the user associated with the request to access the data lake. In addition, the request may include reasons to access the data lake.

Different users may send requests to access a data lake and/or metadata for a variety of purposes. For example, application technical operations may need Hive metadata to manage a Hive database (e.g., and may query metadata to identify tables that are missing required columns) and monitor performance and management. In addition, metadata (e.g., log files) may be used for quality checks of the Hive database. Application teams and/or users may also send notifications (e.g., a metadata report) to related stakeholders and developers.

At step 409, user authorization server 170 (or data access computing platform 110) may retrieve, from the request, user information and data lake information. For example, user authorization server 170 may parse the request to identify user information, user device information, and data lake information. The user information may indicate the name of the user, the group to which the user belongs, and/or the user's previous requests. The user device information may include device identification information (e.g., a MAC address of the user device). The data lake information may include a specific identifier of the data lake and the contents and/or types of metadata associated with the data lake. In addition, user authorization server 170 may parse the request to identify a subset of data. The subset of data may enable the user authorization server 170 to determine whether to authenticate the request to access.

At step 410, user authorization server 170 may authenticate the request to access the data lake based on the retrieved information. In addition, user authorization server 170 may exchange and/or otherwise communicate information associated with authenticating the request with data access computing platform 110. For example, user authorization server 170 may authenticate whether the request to access the data lake is valid based on the user information and the data lake information. Specifically, user authorization server 170 may verify credentials to reliably identify a user. User authorization server 170 may determine whether the user credentials and/or profile matches the data lake information based on a table storing the relationship between different users and data lakes. As discussed above, user authorization server 170 may be integrated into a corporate LDAP layer. The LDAP layer may validate usernames and passwords in conjunction with a directory server. In some embodiments, user authorization server 170 may be integrated into data access computing platform 110 to authenticate the request to access the data lake.

In some embodiments, user authorization server 170 may comprise a Sentry server that manages authentication and/or authorization metadata. For example, the Sentry server may use authentication services such as Kerberos or LDAP to authenticate the user.

In some embodiments, the Sentry server may provide interfaces configured to authorize and manage the use of metadata associated with Hive metastore server 205. The Sentry server may be a pluggable module used in conjunction with Hadoop and Hive. The Sentry server may allow administrators and/or other users to create and update policies and/or rules to validate a user or a user's request to access Hadoop resources (e.g., metadata). For example, data access computing platform 110 (or data server 140) may load a Sentry plugin, and data access requests initiated from user devices may be sent to the Sentry plugin for validation. The Sentry plugin may run in data access computing platform 110 (or data server 140). The Sentry plugin may offer interfaces configured to manipulate authentication and/or authorization metadata stored in the Sentry server. The Sentry plugin may include an authentication and/or authorization policy engine that approves or denies data access requests based on the authentication and/or authorization metadata retrieved from the Sentry server. In this way, data access computing platform 110 may be integrated with a Sentry system that authenticates and authorizes user requests conveniently and efficiently. In addition, data access computing platform 110 may provide seamless integration with a Sentry system to provide one-stop access control solution.

At step 411, user authorization server 170 may authorize the request to access the data lake based on the retrieved information. As discussed above, the authorization of the request may be performed by a Sentry plugin.

In some embodiments, the Sentry plugin may include a RBAC-based authorization module associated with Hadoop. Specifically, the RBAC-based authorization module in the Sentry plugin may authorize user requests associated with a Hadoop cluster (e.g., Hadoop cluster 210) based on one or more roles associated with the user.

Referring to FIG. 4C, at step 412, user authorization server 170 may send one or more notifications to the user device. For example, user authorization server 170 may send, via a communication interface, one or more notifications to one or more user devices 150A-150N. In some embodiments, the notifications may be sent by data access computing platform 110 via communication interface 113 instead of user authorization server 170. The notifications may indicate whether the user's request has been granted or denied. The notifications may also request additional information of the user or the requested file. In addition, the notifications may indicate whether the requested metadata exists in the corresponding data lake. If the requested metadata is not in the corresponding data lake, the notifications may indicate an estimated time that the requested metadata will be moved to the corresponding data lake. The notifications may be sent to one or more graphical user interfaces associated with the user devices.

At step 413, data access computing platform 110 may provide or deny access to the data lake based on the authorization result. For example, if the request to access the metadata in a corresponding data lake is approved, data access computing platform 110 may provide, to the requested user device, access to the data lake or the metadata in the corresponding data lake. If the request to access the metadata in a corresponding data lake is denied, data access computing platform 110 might not provide, to the requested user device, access to the data lake or the metadata in the corresponding data lake.

Figure 5:
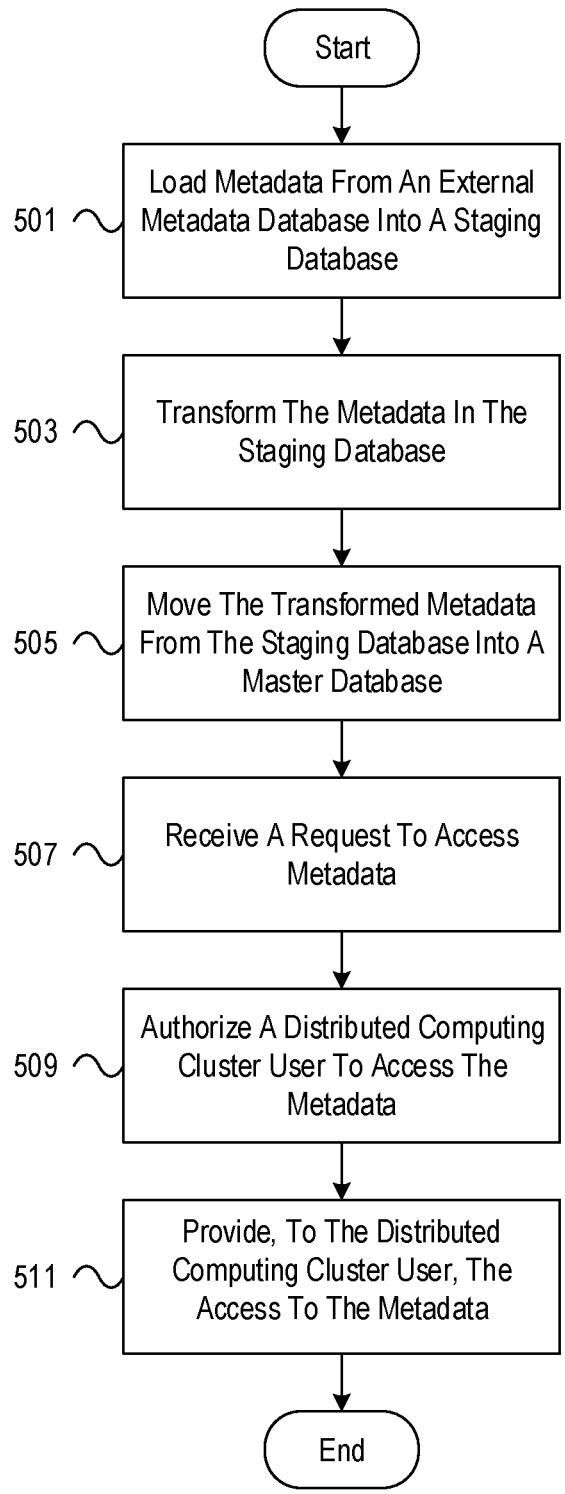
FIG. 5 depicts an illustrative method for providing metadata access to distributed user devices in accordance with one or more example embodiments.

FIG. 5 depicts an illustrative method for providing metadata access to distributed user devices in accordance with one or more example embodiments. Referring to FIG. 5, at step 501, a computing platform (e.g., data access computing platform 110) having at least one processor, a communication interface, and memory may load metadata from an external metadata database into a staging database. At step 503, the computing platform may transform the metadata in the staging database. In transforming the metadata in the staging database, the computing platform may decouple one or more data models in the metadata, resulting in one or more decoupled data models. Then, the computing platform may denormalize the one or more decoupled data models, resulting in transformed metadata. At step 505, the computing platform may move the transformed metadata from the staging database into a master database. The master database may comprise information indicating a relationship between the transformed metadata and one or more distributed data lakes. At step 507, the computing platform may receive, via the communication interface and from at least one distributed computing cluster user device linked to at least one distributed computing cluster user, a request to access one or more metadata items. At step 509, in response to receiving the request to access the one or more metadata items, the computing platform may authorize the at least one distributed computing cluster user to access at least one metadata item of the one or more metadata items based on the information indicating the relationship between the transformed metadata and the one or more distributed data lakes. At step 511, the computing platform may provide, to the at least one distributed computing cluster user device linked to the at least one distributed computing cluster user, access to the at least one metadata item of the one or more metadata items based on authorizing the at least one distributed computing cluster user to access the at least one metadata item of the one or more metadata items.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   load metadata from an external metadata database into a staging database;
   transform the metadata in the staging database, wherein transforming the metadata in the staging database comprises:
      decoupling one or more data models in the metadata, resulting in one or more decoupled data models; and
      denormalizing the one or more decoupled data models, resulting in transformed metadata;
   move the transformed metadata from the staging database into a master database, wherein the master database comprises information indicating a relationship between the transformed metadata and one or more distributed data lakes;
   receive, via the communication interface and from at least one distributed computing cluster user device linked to at least one distributed computing cluster user, a request to access one or more metadata items;
   in response to receiving the request to access the one or more metadata items, authorize the at least one distributed computing cluster user to access at least one metadata item of the one or more metadata items based on the information indicating the relationship between the transformed metadata and the one or more distributed data lakes; and
   based on authorizing the at least one distributed computing cluster user to access the at least one metadata item of the one or more metadata items, provide, to the at least one distributed computing cluster user device linked to the at least one distributed computing cluster user, access to the at least one metadata item of the one or more metadata items.

2. The computing platform of claim 1, wherein loading the metadata from the external metadata database into the staging database comprises loading the metadata from a Hive metadata database into the staging database.

3. The computing platform of claim 1, wherein loading the metadata from the external metadata database into the staging database comprises loading the metadata from a replicated database for Hive metadata into the staging database.

4. The computing platform of claim 1, wherein receiving, via the communication interface and from the at least one distributed computing cluster user device linked to the at least one distributed computing cluster user, the request to access the one or more metadata items comprises:

receiving, via the communication interface and from the at least one distributed computing cluster user device linked to a Hadoop data lake user, the request to access the one or more metadata.

5. The computing platform of claim 1, wherein loading the metadata from the external metadata database into the staging database comprises:

loading the metadata from the external metadata database stored on a first server into the staging database, and wherein a main database storing data associated with the metadata is stored on a second server.

6. The computing platform of claim 1, wherein loading the metadata from the external metadata database comprises:

performing an extract, transform, and load (ETL) process on the metadata in the external metadata database to store the metadata in the staging database.

7. The computing platform of claim 1, wherein authorizing the at least one distributed computing cluster user to access the at least one metadata item of the one or more metadata items based on the information indicating the relationship between the transformed metadata and the one or more distributed data lakes comprises:

authorizing the at least one distributed computing cluster user to access the at least one metadata item of the one or more metadata items based on the information indicating the relationship between the transformed metadata and the one or more distributed data lakes and based on role-based access control.

8. The computing platform of claim 1, wherein the memory stores additional computer-readable instructions that, when executed by the at least one processor, cause the computing platform to:

distribute the metadata from the master database into a plurality of individual databases based on the information indicating the relationship between the transformed metadata and the one or more distributed data lakes, wherein at least one individual database of the plurality of individual databases corresponds to at least one data lake of the one or more distributed data lakes; and publish the at least one individual database of the plurality of individual databases into the at least one data lake of the one or more distributed data lakes.

9. The computing platform of claim 1, wherein loading the metadata from the external metadata database into the staging database comprises loading the metadata from a MySQL database for Hive metadata into the staging database.

10. A method, comprising:

at a computing platform comprising at least one processor, a communication interface, and memory:

loading, by the at least one processor, metadata from an external metadata database into a staging database;

transforming, by the at least one processor, the metadata in the staging database, wherein transforming the metadata in the staging database comprises:

decoupling one or more data models in the metadata, resulting in one or more decoupled data models; and denormalizing the one or more decoupled data models, resulting in transformed metadata;

moving, by the at least one processor, the transformed metadata from the staging database into a master database, wherein the master database comprises information indicating a relationship between the transformed metadata and one or more distributed data lakes;

receiving, by the at least one processor, via the communication interface and from at least one distributed computing cluster user device linked to at least one distributed computing cluster user, a request to access one or more metadata items;

in response to receiving the request to access the one or more metadata items, authorizing, by the at least one processor, the at least one distributed computing cluster user to access at least one metadata item of the one or more metadata items based on the information indicating the relationship between the transformed metadata and the one or more distributed data lakes; and based on authorizing the at least one distributed computing cluster user to access the at least one metadata item of the one or more metadata items, providing, by the at least one processor and to the at least one distributed computing cluster user device linked to the at least one distributed computing cluster user, access to the at least one metadata item of the one or more metadata items.

11. The method of claim 10, wherein loading the metadata from the external metadata database into the staging database comprises loading the metadata from a Hive metadata database into the staging database.

12. The method of claim 10, wherein loading the metadata from the external metadata database into the staging database comprises loading the metadata from a replicated database for Hive metadata into the staging database.

13. The method of claim 10, wherein receiving, via the communication interface and from the at least one distributed computing cluster user device linked to the at least one distributed computing cluster user, the request to access the one or more metadata items comprises:

receiving, via the communication interface and from the at least one distributed computing cluster user device linked to a Hadoop data lake user, the request to access the one or more metadata.

14. The method of claim 10, wherein loading the metadata from the external metadata database into the staging database comprises:

loading the metadata from the external metadata database stored on a first server into the staging database, and wherein a main database storing data associated with the metadata is stored on a second server.

15. The method of claim 10, wherein loading the metadata from the external metadata database comprises:

performing an extract, transform, and load (ETL) process on the metadata in the external metadata database to store the metadata in the staging database.

16. The method of claim 10, wherein authorizing the at least one distributed computing cluster user to access the at least one metadata item of the one or more metadata items based on the information indicating the relationship between the transformed metadata and the one or more distributed data lakes comprises:

authorizing the at least one distributed computing cluster user to access the at least one metadata item of the one or more metadata items based on the information indicating the relationship between the transformed metadata and the one or more distributed data lakes and based on role-based access control.

17. The method of claim 10, further comprising:
distributing, by the at least one processor, the metadata from the master database into a plurality of individual databases based on the information indicating the relationship between the transformed metadata and the one or more distributed data lakes, wherein at least one individual database of the plurality of individual databases corresponds to at least one data lake of the one or more distributed data lakes; and
publishing, by the at least one processor, the at least one individual database of the plurality of individual databases into the at least one data lake of the one or more distributed data lakes.

18. The method of claim 10, wherein loading the metadata from the external metadata database into the staging database comprises loading the metadata from a MySQL database for Hive metadata into the staging database.

19. One or more non-transitory computer-readable media storing instructions that, when executed by a computing platform comprising at least one processor, a communication interface, and memory, cause the computing platform to:
load metadata from an external metadata database into a staging database;
transform the metadata in the staging database, wherein transforming the metadata in the staging database comprises:
decoupling one or more data models in the metadata, resulting in one or more decoupled data models; and
denormalizing the one or more decoupled data models, resulting in transformed metadata;
move the transformed metadata from the staging database into a master database, wherein the master database comprises information indicating a relationship between the transformed metadata and one or more distributed data lakes;
receive, via the communication interface and from at least one distributed computing cluster user device linked to at least one distributed computing cluster user, a request to access one or more metadata items;
in response to receiving the request to access the one or more metadata items, authorize the at least one distributed computing cluster user to access at least one metadata item of the one or more metadata items based on the information indicating the relationship between the transformed metadata and the one or more distributed data lakes; and
based on authorizing the at least one distributed computing cluster user to access the at least one metadata item of the one or more metadata items, provide, to the at least one distributed computing cluster user device linked to the at least one distributed computing cluster user, access to the at least one metadata item of the one or more metadata items.

20. The one or more non-transitory computer-readable media of claim 19, wherein loading the metadata from the external metadata database into the staging database comprises loading the metadata from a replicated database for Hive metadata into the staging database.

* * * * *